United States Patent
Mills et al.

(10) Patent No.: US 6,857,315 B1
(45) Date of Patent: Feb. 22, 2005

(54) ARMORED TUBULAR SIGHT GAUGE WITH INTEGRAL VALVES AND MISALIGNMENT UNIONS

(75) Inventors: Stephen K. Mills, Tulsa, OK (US); R. Darrell Miller, Sand Springs, OK (US)

(73) Assignee: Kenco International, Inc., Tulsa, OK (US)

( * ) Notice: Subject to any disclaimer, the term of this patent is extended or adjusted under 35 U.S.C. 154(b) by 0 days.

(21) Appl. No.: 10/320,996

(22) Filed: Dec. 17, 2002

(51) Int. Cl.⁷ .............................................. G01F 23/02
(52) U.S. Cl. .......................... 73/323; 73/325; 73/326; 73/327; 73/328; 73/331; 73/332; 116/227; 116/276
(58) Field of Search ....................... 73/323, 325, 326, 73/327, 328, 331, 332; 116/227, 276

(56) References Cited

U.S. PATENT DOCUMENTS

| | | |
|---|---|---|
| 1,175,834 A | 3/1916 | Stephens |
| 1,204,728 A | 11/1916 | Arena |
| 1,263,777 A | 4/1918 | Langton et al. |
| 1,304,980 A | 5/1919 | Hirshstein |
| 1,620,692 A | 3/1927 | Rigney |
| 1,632,042 A | 6/1927 | Price et al. |
| 2,523,741 A | 9/1950 | Weschler et al. |
| 2,659,389 A | 11/1953 | Harvey |
| 3,479,874 A | * 11/1969 | Lukas et al. .................. 73/292 |
| 3,691,835 A | 9/1972 | Metzger |
| 3,886,796 A | 6/1975 | Gruett |
| 5,323,653 A | 6/1994 | Gruett |
| 5,323,654 A | 6/1994 | Newman |
| 5,442,959 A | 8/1995 | Mills |
| 5,648,607 A | 7/1997 | Wolf |
| 6,234,018 B1 | 5/2001 | Kelada |

* cited by examiner

Primary Examiner—Hezron Williams
Assistant Examiner—André K. Jackson
(74) Attorney, Agent, or Firm—Head, Johnson & Kachigian

(57) ABSTRACT

An armored sight gauge assembly of the type having a sight tube that is placed between first and second spaced apart fittings to show a liquid level comprising an elongated main body positioned between and permanently connected to the first and second fittings. The main body incorporates a flanged U-shaped frame member to which there is removably affixed a transparent sight tube shield. A sight tube assembly substantially surrounded by the flanged U-shaped frame member on three sides and is insertably captured by the first and second fittings. A valve assembly and ball check shutoff is incorporated within the internal portion of each of the first and second fittings as is a misalignment union which is removably attached to each fitting.

8 Claims, 3 Drawing Sheets

ARMORED TUBULAR SIGHT GAUGE WITH INTEGRAL VALVES AND MISALIGNMENT UNIONS

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

In general, the present invention relates to gauges which depict the liquid level of a containment vessel when connected thereto. In particular, the instant invention relates to a single-pieced armored sight gauge incorporating integral valves and misalignment unions.

BACKGROUND OF THE INVENTION

It has long been a practice to use an elongated tubular member connected with fittings at each end to show the level of liquid in a containment vessel when attached thereto. This type of liquid level indication is commonly used because it is inexpensive and is fail proof since it does not depend on any mechanical or electrical mechanism to indicate liquid level.

One problem associated with the use of sight tubes for indicating liquid level is the danger of breakage. Any small diameter elongated tube of transparent material, whether glass or plastic, is susceptible of being broken by tools, broom handles, wind-blown objects and so forth. If a sight tube is broken, spillage of liquid contents from the containment vessel can be a problem. The problem can be particularly serious if the contents are hazardous, such as combustible liquids.

Others have provided protective sight gauges. A particularly relevant reference is U.S. Pat. No. 4,693,117 issued on Sep. 15, 1987 entitled "Replacement Element For A Liquid Level Gauge Sight Tube". This patent shows a sight tube arrangement having upper and lower tubular portions that can be expeditiously received in compression type fittings secured to a vessel. This patent teaches a tubular gauge having a metallic shield member surrounding three sides of the sight tube and a transparent window closing the front of the shield. This type of liquid level sight gauge has proven very effective in providing increased safety since the sight tube is protected from inadvertent breakage. However, the system of U.S. Pat. No. 4,693,117 has the disadvantage in that tubular gauge has to be connected to additional components on each end to enable it to be connected to the containment vessel.

For further background material to sight gauges, see the following previously issued U.S. Pat. Nos. 635,565; 657,329; 743,178; 837,467; 845,258; 998,104; 1,006,105; 1,110,974; 1,132,372; 1,157,708; 1,159,764; 1,227,196; 1,239,304; 2,533,490; 2,792,710 and 5,442,959.

A large percentage of applications for liquid level gauges in process industries are low to medium pressure applications of less than 500 psig. These sight gauges use a clear sight tube for easy viewing of the liquid level. The materials of the clear sight tube are either glass or a transparent type of plastic (such as polycarbonate). Mechanical gauges are commonly installed onto tanks (a.k.a. "containment vessels") using several different methods:

1. In-line level gauge installed between a tubular valve at either end. The gauge and tubular valves are separate entities. The gauge is fabricated to fit between the customer supplied centerline distance between the tubular valves.
2. Gauge with 90° connections for threading directly into tank. No valves of any sort (for control of inventory) are included in this configuration.
3. The third method combines a level gauge and tubular valves into one construction. The valves on either end have a ball check shutoff to isolate gauge and containment vessel if an unequalized pressure condition exists (such as when sight tube breakage occurs). The offset valve design allows easy access to the sight tube for cleaning, removal or routine maintenance.

The present invention advances the art and resolves longstanding problems associated with all of the above constructions. The following further elaborates upon problems common to gauges of the contemporary art.

1. Gauge is built with incorrect centerlines. In the design stage, the systems designer will specify a centerline dimension for the level gauge. In actual fabrication of the containment vessel, the vessel fabricator, for several different reasons, may not be able to hold the centerline dimension desired. Expensive rework and labor will add cost and aggravation to completing the containment vessel/level gauge assembly.
2. Additional fittings are required. In many cases, several additional fittings, such as unions and valves, must be mated together to complete the assembly.
3. Leak Points. There are several leak points in the installations listed above. There is the potential for a leak between the gauge and whatever control valve is installed. Unions might be required to connect the gauge to the tank. All of these additional connections add cost and labor to the gauge and vessel assembly process.
4. Safety. In many configurations, the sight tube component of the level gauge is exposed to environmental elements. If sight tube breakage occurs, there is the potential for operator injury and exposure to chemical and/or a chemical spill.

The gauge of the instant invention advances the art disclosed and claimed in the background material by disclosing an armored liquid level gauge with integral valves, ball check shutoffs and misalignment union vessel connections. The invention's innovative misalignment union structure provides for a gauge assembly that accommodates up to a ¼" of misalignment between the level gauge and containment vessel centerline connections.

Although misalignment unions have been available, such unions have never been incorporated into an armored level gauge assembly with integral valves and ball check shutoffs. Consequently, unions and other fittings normally required of a piping configuration into the containment vessel are now an integral part of the level gauge via the teachings of the instant invention. This lowers the total cost of the level gauge and containment vessel assembly and minimizes the number of potential leak points associated with the additional fittings required with other types of level gauges.

BRIEF SUMMARY OF THE INVENTION

An armored sight gauge assembly of the type having a sight tube that is placed between first and second spaced apart fittings to show a liquid level comprising an elongated main body positioned between and permanently connected to said first and second fittings, said main body having a flanged U-shaped frame member to which there is removably affixed a transparent sight tube shield; a sight tube assembly substantially surrounded by said flanged U-shaped frame member on three sides and insertably captured by said first and second fittings; a valve assembly and ball check shutoff incorporated within the internal portion of each of said first and second fittings; and a misalignment union removably attached to each of said first and second fittings.

An object of the instant invention is to provide a single-piece armored liquid level gauge with integral valves and misalignment unions.

Another object of the instant invention is to isolate the level gauge from the containment vessel if an unequalized pressure condition exists (such as if sight tube breakage occurs). This is done with the internal ball check shutoff within each integral valve.

An additional object of the instant invention is to afford a rugged, reliable and compact instrument with fewer leak points resulting in the lowering of on-going maintenance costs.

A further object of the instant invention is to eliminate the necessity for centerline measurement exactness. The innovative misalignment union structure allows for up to a ¼" of misalignment between the level gauge and containment vessel centerline connections.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

Figure 1:
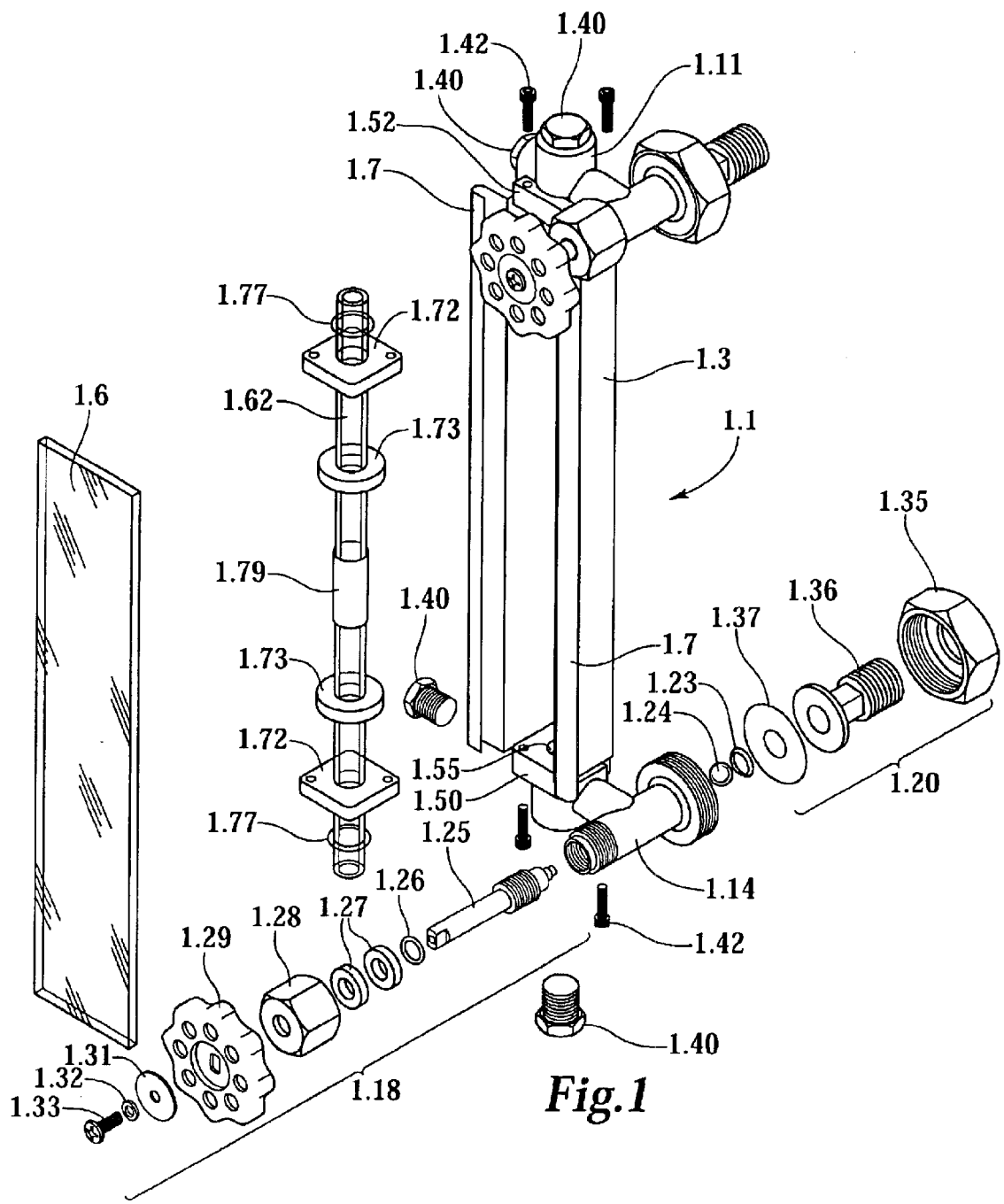
FIG. 1 is an exploded view illustration of the armored tubular sight gauge of the instant invention.

Referring first to FIG. 1 is an exploded view illustration of the instant invention's armored tubular sight gauge wherein said gauges structural elements and element assembly relationships are observed, the invention is generally indicated by the number 1.1. As disclosed in FIG. 1 the instant invention 1.1 is comprised of an elongated main body having a flanged U-shaped frame member 1.3 to which there is removably affixed a transparent sight tube shield 1.6. Said removable transparent sight tube shield 1.6 is insertably positioned within flanged members 1.7 which are a formed part of U-shaped frame member 1.3. The U-shaped frame member 1.3 is permanently positioned between upper 1.11 and lower 1.14 connection blocks. Said blocks 1.11, 1.14 are permanently connected to said frame 1.3 via welding or other similarly intended permanent attachment means thus forming a unitary body construction. Each connection block incorporates shutoff valve 1.18 and misalignment union 1.20. Shutoff valve assembly as illustrated in FIG. 1 further comprises retainer 1.23 for ball check 1.24, valve stem 1.25, valve stem packing washer 1.26, valve stem packing 1.27, valve stem packing nut 1.28, valve stem hand wheel 1.29, identification plate 1.31, lock washer 1.32 and hand wheel retention screw 1.33.

As further illustrated in FIG. 1, misalignment union 1.20 is removably attached to connection block 1.14 via union nut 1.35 which positionally secures process connection 1.36 and union gasket 1.37. As illustrated in association with the connection blocks of the instant invention 1.11, 1.14 are pipe plugs 1.40 which are shown screwed in place with respect to upper connection block 1.11 and removed in association with lower connection block 1.14.

Figure 2:
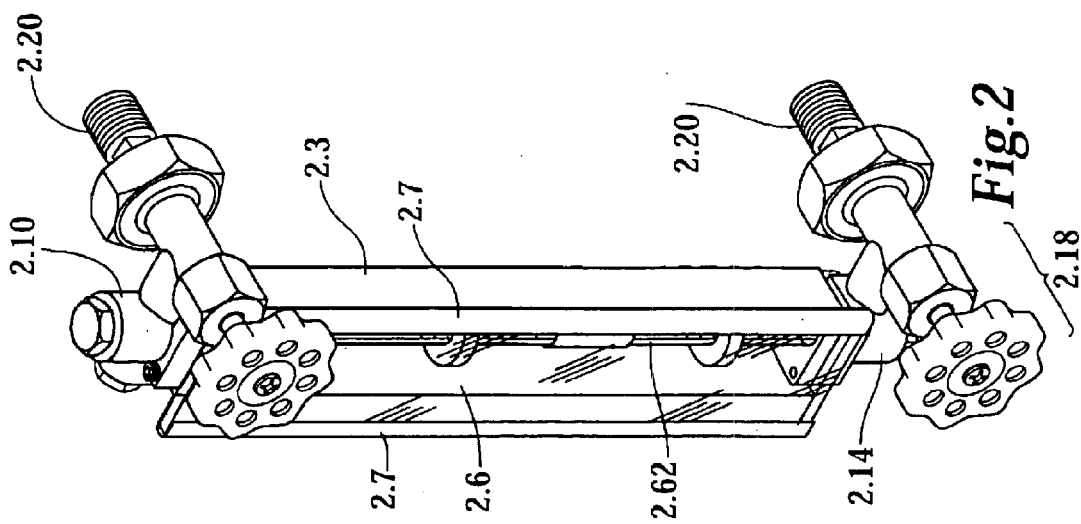
FIG. 2 is an illustration of armored tubular sight gauge of this invention showing upper and lower connection blocks with integral valves and misalignment unions, the liquid level sight gauge being supported between the upper and lower connection blocks.

Lower sight tube receiving block 1.50 and upper sight tube receiving block 1.52 are further illustrated in FIG. 1 wherein an appropriately dimensioned opening 1.55 is bored through said receiving blocks 1.50, 1.52 to allow sight tube 1.62 to be insertably positioned and sealed therein. The sight tube 1.62 is further comprised of upper and lower O-ring seals 1.77, upper and lower O-ring compression plates 1.72, sight tube isolators 1.73 and as required a sight tube splicer 1.79. Said O-ring seals 1.77 are compressed against insertably positioned sight tube 1.62 and receiving blocks 1.50, 1.52 via compression plates 1.72 and compression plate retention screws 1.42. FIG. 2 illustrates armored tubular sight gauge of the instant invention in its assembled state. Turning now to FIG. 2.

In FIG. 2, the invention's elongated main body 2.3 is shown in association with elongated body flange members 2.7 with a transparent sight tube shield 2.6 inserted therein. Further illustrated in FIG. 2 is the sight tube 2.62 of the invention shown positioned behind said sight tube shield 2.6 and surrounded in a U-shaped manner by frame member 2.3. Upper and lower single-piece connection blocks 2.10 and 2.14 are shown permanently connected to said U-shaped frame member 2.3 via welding or other permanently intended attachment means. Upper and lower misalignment union members 2.20 are shown insertably attached to said upper connection block 2.10 and lower connection block 2.14. Lastly illustrated in FIG. 2 is the integral shutoff valve assembly of the instant invention generally indicated as 2.18.

Figure 3:
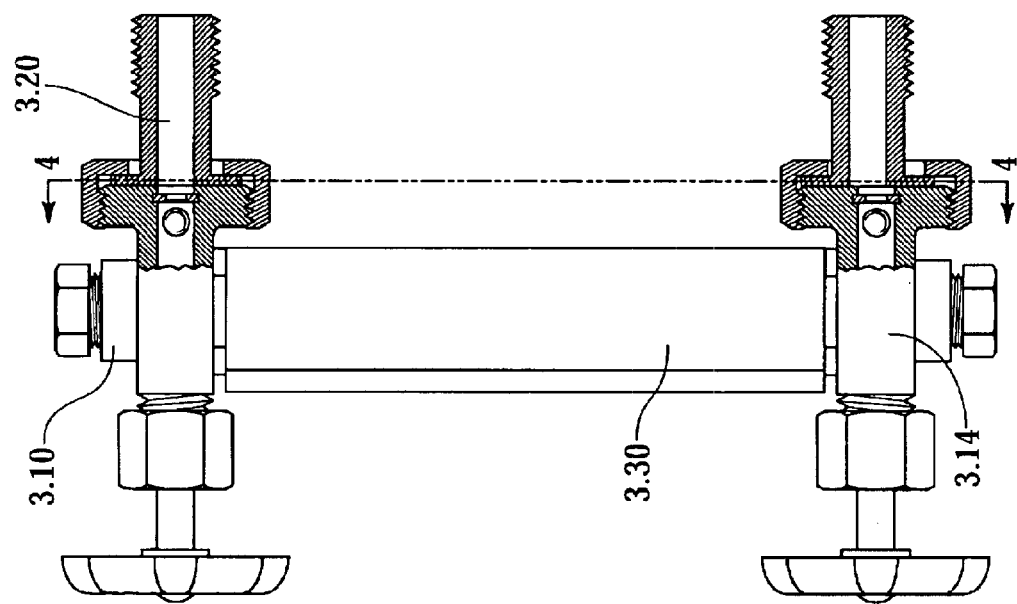
FIG. 3 is a partial cross-section illustration of the armored tubular sight gauge of FIGS. 1 and 2 providing further detail of variably positioned misalignment unions.

FIG. 3 illustrates a partial cross-sectional view of the armored tubular sight gauge providing further detail of variably positioned misalignment unions. In FIG. 3, the upper misalignment union 3.20 is shown positioned without need for adjustment to connect to a containment vessel (not shown). Continuing with discussion of FIG. 3, the lower misalignment union 3.20 of the instant invention is shown having to compensate upwardly along line 4 to allow for connection to a containment vessel (not shown). Specified centerline distance between containment vessel connections and actual distance do not always coincide. With potential misalignment between vessel connections and level gauge connections being common, the instant invention, allowing up to a ¼" of misalignment accommodation, offers an effective solution for this problem in the field. Though disclosed for illustrative purposes, a misalignment accommodation of up to a ¼" is not intended as a structural limitation of the instant invention. Rather, it is apparent that one skilled in the art can readily envision deployment of a greater or lesser misalignment accommodation via appropriate dimensioning of the instant invention's disclosed structural components.

Figure 4:
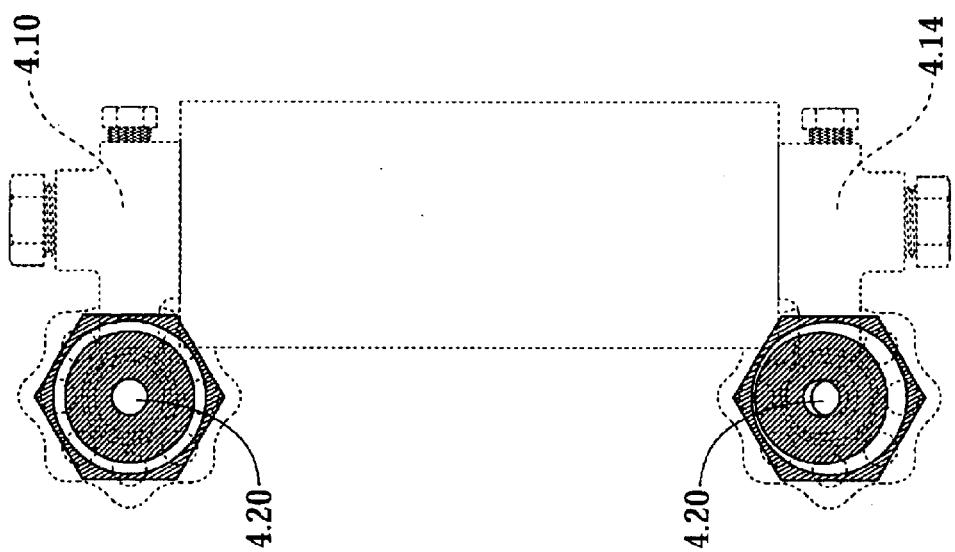
FIG. 4 is a partial phantom-back illustration of the armored tubular sight gauge of FIGS. 1, 2 and 3 providing end view detail of variably positioned misalignment unions.

FIG. 4 illustrates a partial phantom-back illustration of the adaptability of the misalignment connection with respect to the lower connection block as illustrated in FIG. 3. Upper misalignment union 4.20 reflects connection to a containment vessel without need for misalignment accommodation where lower misalignment union 4.20 indicates the positioning and misalignment communication as previously discussed in association with FIG. 3.

Figure 5:
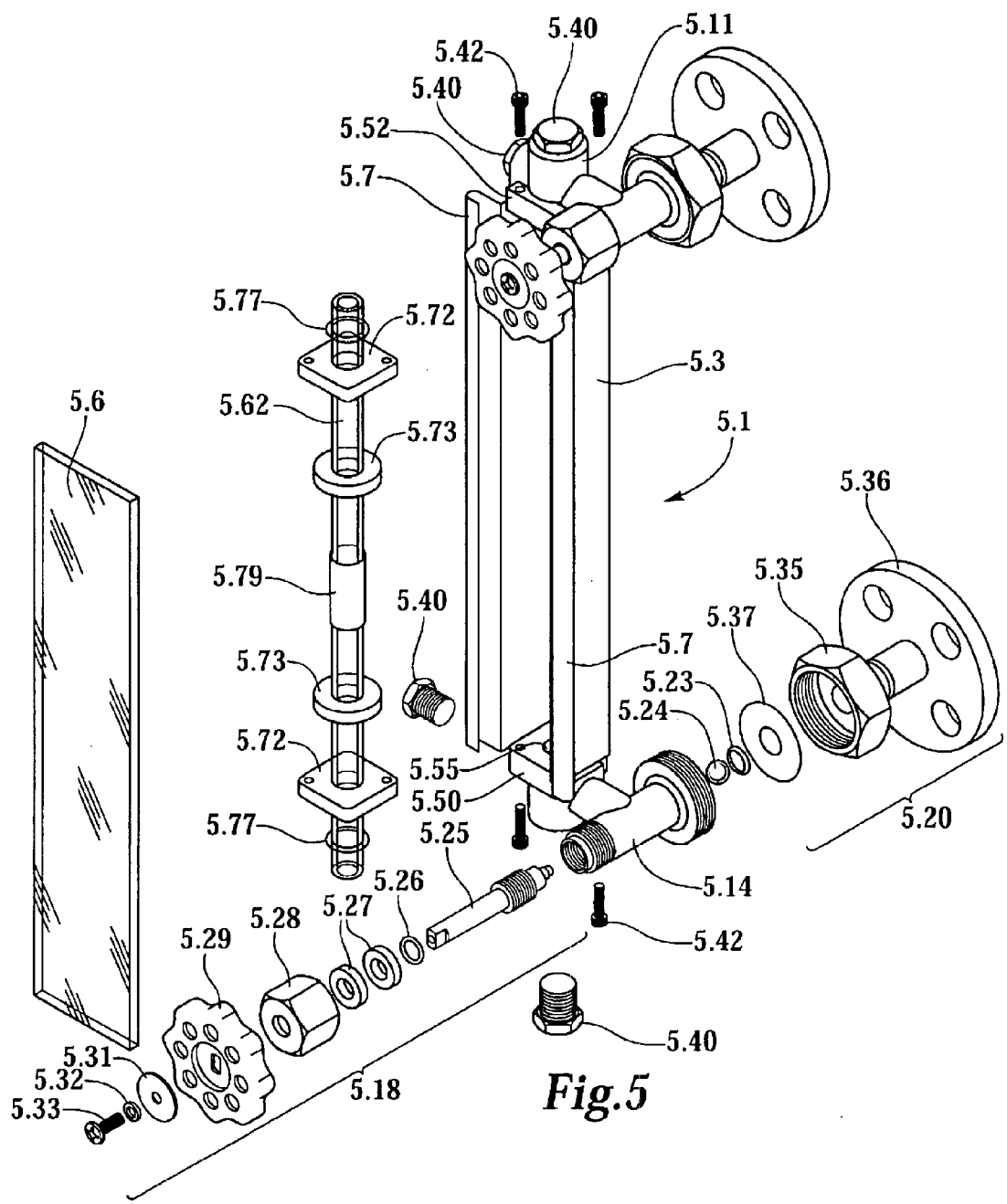
FIG. 5 is a readily envisioned alternative embodiment of FIG. 1 utilizing flanged process connections instead of threaded.

FIG. 5 is a readily envisioned alternative embodiment of FIG. 1 utilizing flanged process connections 5.36 instead of FIG. 1 threaded process connections 1.36. As disclosed in FIG. 5 the instant invention 5.1 is comprised of an elongated main body having a flanged U-shaped frame member 5.3 to which there is removably affixed a transparent sight tube shield 5.6. Said removable transparent sight tube shield 5.6 is insertably positioned within flanged members 5.7 formed as a part of shaped frame member 5.3. The U-shaped frame member 5.3 is permanently positioned between upper 5.11 and lower 5.14 connection blocks. Said blocks 5.11, 5.14 are permanently connected to said frame 5.3 via welding or other similarly intended permanent attachment means thus forming a unitary body construction. Each connection block incorporates shutoff valve 5.18 and misalignment union 5.20 including a flange attachment member 5.36 which is attached via welding or other similarly intended attachment means to a containment vessel (not illustrated in FIG. 5). Shutoff valve assembly as illustrated in FIG. 5 further comprises retainer 5.23 for check ball 5.24, valve stem 5.25, valve stem packing washer 5.26, valve stem packing 5.27, valve stem packing nut 5.28, valve stem hand wheel 5.29, identification plate 5.31, lock washer 5.32 and hand wheel retention screw 5.33.

As further illustrated in FIG. 5, misalignment union 5.20 is removably attached to connection block 5.14 via union nut 5.35 which positionally secures process connection 5.36 and union gasket 5.37. As illustrated in association with the connection blocks of the instant invention 5.11, 5.14 are pipe plugs 5.40 which are shown screwed in place with respect to upper connection block 5.11 and exploded view in association with lower connection block 5.14.

Lower sight tube receiving block 5.50 and upper sight tube receiving block 5.52 are further illustrated in FIG. 5 wherein an appropriately dimensioned opening 5.55 is bored through said receiving blocks 5.50, 5.52 to allow sight tube 5.62 to be insertably positioned therein. The sight tube 5.62 of the instant invention insertably received into opening 5.55 of both upper and lower receiving blocks 5.50 and 5.52, said sight tube assembly further comprising sight tube 5.62, upper and lower O-rings 5.77, upper and lower O-ring compression plates 5.72, sight tube isolator 5.73 and a sight tube splicer as required 5.79.

The liquid level gauge as described herein is an improvement over the prior art in that it provides a visual liquid level gauge characterized by economy and simplicity of construction and one that has the advantage of incorporating integral shutoff valves, ball checks and misalignment means within said first and second fittings.

The claims and specifications describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed:

1. An armored sight gauge assembly of the type having a sight tube that is placed between first and second spaced apart fittings to show a liquid level comprising:

an elongated main body positioned between and permanently connected to said first and second fittings, said main body having a flanged U-shaped frame member to which there is removably affixed a transparent sight tube shield;

a sight tube assembly substantially surrounded by said flanged U-shaped frame member on three sides and insertably captured by said first and second fittings;

a valve assembly incorporated within the internal portion of each of said first and second fittings;

a ball check shutoff incorporated within the internal portion of each of said first and second fittings; and a misalignment union removably attached to each of said first and second fittings, the misalignment union having a process connection and gasket, and a union nut to threadably compress said gasket and connect said process connection to each of said fittings permitting an adaptively parallel connection of misaligned structures, wherein said misalignment union is integral with said sight gauge assembly.

2. The gauge assembly of claim 1 wherein said sight tube assembly further comprises:

a sight tube;

an O-ring seal circumferentially positioned around each of generally opposite ends of said sight tube;

an O-ring compression plate circumferentially positioned around said sight tube and adjacent to each of said O-ring seals;

a sight tube isolator circumferentially positioned around said sight tube and distally adjacent to each of said O-ring compression plates.

3. The gauge assembly of claim 1 wherein said valve assembly further comprises:

a handwheel for manually operating said shutoff valve to allow passage there through of a liquid; and at least one ball check shutoff to isolate the level gauge from continuing passage there through of a liquid.

4. An armored sight gauge assembly of the type having a sight tube that is placed between first and second spaced apart fittings to show a liquid level comprising:

an elongated main body positioned between and permanently connected to said first and second fittings, said main body having a flanged U-shaped frame member to which there is removably affixed a transparent sight tube shield;

a sight tube assembly substantially surrounded by said flanged U-shaped frame member on three sides and insertably captured by said first and second fittings;

a valve assembly incorporated within the internal portion of each of said first and second fittings;

a misalignment union removably attached to each of said first and second fittings, the misalignment union having a process connection and gasket;

a union nut to threadably compress said gasket and connect said process connection to said each of said fittings; and a flange attachment member attached to said misalignment union.

5. The gauge assembly of claim 4 wherein said sight tube assembly further comprises:

a sight tube;

an O-ring seal circumferentially positioned around each of generally opposite ends of said sight tube;

an O-ring compression plate circumferentially positioned around said sight tube and adjacent to each of said O-ring seals;

a sight tube isolator circumferentially positioned around said sight tube and distally adjacent to each of said O-ring compression plates; and a sight tube splicer circumferentially positioned around said sight tube and positioned equally distal between said sight tube isolators.

6. The gauge assembly of claim 4 wherein said valve assembly further comprises:

a handwheel for manually operating said shutoff valve to allow passage there through of a liquid.

7. An armored sight gauge assembly of the type having a sight tube that is placed between first and second spaced apart fittings to show a liquid level comprising:

an elongated main body positioned between and permanently connected to said first and second fittings, said main body having a flanged U-shaped frame member to which there is removably affixed a transparent sight tube shield;

a sight tube assembly substantially surrounded by said flanged U-shaped frame member on three sides and insertably captured by said first and second fittings;

a valve assembly incorporated within the internal portion of each of said first and second fittings;

a misalignment union removably attached to each of said first and second fittings;

a flange attachment member attached to each of said misalignment unions;

a process connection and gasket; and a union nut to threadably compress said gasket and connect said process connection to said fittings.

8. The gauge assembly of claim 2 further comprising a sight tube splicer circumferentially positioned around said sight tube and positioned equally distal between said sight tube isolators.

* * * * *